(12) United States Patent
Oliver

(10) Patent No.: US 12,003,648 B2
(45) Date of Patent: Jun. 4, 2024

(54) METHOD AND APPARATUS FOR SECURING REAL-TIME DATA TRANSFER FROM A DEVICE

(71) Applicant: Nokia Technologies Oy, Espoo (FI)

(72) Inventor: Ian Justin Oliver, Soderkulla (FI)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 17/400,059

(22) Filed: Aug. 11, 2021

(65) Prior Publication Data

US 2022/0052856 A1 Feb. 17, 2022

(30) Foreign Application Priority Data

Aug. 14, 2020 (FI) ..................................... 20205796

(51) Int. Cl.
*H04L 9/32* (2006.01)
(52) U.S. Cl.
CPC .......... *H04L 9/3247* (2013.01); *H04L 9/3236* (2013.01); *H04L 9/3297* (2013.01)
(58) Field of Classification Search
None
See application file for complete search history.

(56) References Cited

U.S. PATENT DOCUMENTS

| | | | |
|---|---|---|---|
| 10,346,614 B1 | 7/2019 | Ko | |
| 10,382,209 B2* | 8/2019 | Abt, Jr. | ................. H04W 12/02 |
| 10,742,421 B1* | 8/2020 | Wentz | ................... H04L 9/0897 |
| 2004/0193888 A1* | 9/2004 | Wiseman | ................ G06F 21/64 |
| | | | 713/176 |
| 2009/0210707 A1* | 8/2009 | De Lutiis | .............. H04L 63/123 |
| | | | 713/170 |
| 2019/0349450 A1* | 11/2019 | Brandwine | ........... H04L 63/126 |
| 2020/0322161 A1* | 10/2020 | Davies | ................ H04L 63/0876 |

FOREIGN PATENT DOCUMENTS

WO 2016/048177 A1 3/2016

OTHER PUBLICATIONS

FI Non Provisional Application No. 20205221, "Trusted Data Provenance", filed on Mar. 3, 2020, 57 pages.
Office action received for corresponding Finnish Patent Application No. 20205796, dated Mar. 1, 2021, 11 pages.

(Continued)

*Primary Examiner* — Piotr Poltorak
*Assistant Examiner* — Suman Debnath
(74) *Attorney, Agent, or Firm* — Nokia Technologies Oy

(57) ABSTRACT

Real-time data transfer from a device is secured by: receiving data items from a data source, buffering and continually sending same to a data collector; generating by a root of trust a cryptographically verifiable integrity claim based on current hardware and software configuration of the apparatus; forming second data by combining at least the cryptographically verifiable integrity claim and an amount of the data items; forming a hash from at least the second data; obtaining a stamp; causing the root of trust circuitry to form a first signature from at least the hash; forming third data by combining at least the second data, the hash and the first signature; and providing the data collector with a secured transmission comprising the third data.

15 Claims, 5 Drawing Sheets

(56) References Cited

OTHER PUBLICATIONS

Ambrosin et al., "Collective Remote Attestation at the Internet of Things Scale: State-of-the-Art and Future Challenges", IEEE Communications Surveys & Tutorials, vol. 22, No. 4, Fourthquarter 2020, pp. 2447-2461.
"Cryptographic Nonce", Wikipedia, Retrieved on Aug. 16, 2021, Webpage available at : https://en.wikipedia.org/wiki/Cryptographic_nonce.
Office action received for corresponding Finnish Patent Application No. 20205796, dated Nov. 10, 2021, 9 pages.
Extended European Search Report received for corresponding European Patent Application No. 21187329.4, dated Jan. 19, 2022, 7 pages.
Notice of Allowance received for corresponding European Patent Application No. 21187329.4, dated Dec. 6, 2023, 7 pages.

\* cited by examiner

Fig. 6

600. receiving from the data source a plurality of data items, e.g., from one or more medical sensors 605. continually providing by an output a data collector with the data items 610. buffering by the memory the first data items 615. generating by a root of trust circuitry a cryptographically verifiable claim based on current hardware and software configuration of the apparatus 620. forming second data by combining at least the cryptographically verifiable integrity claim and an amount of the data items 625. forming a hash from at least the second data 630. Optionally obtaining a stamp 635. causing the root of trust circuitry to form a first signature from at least the hash and optionally of the stamp 640. forming third data by combining at least the second data, the hash and the first signature 645. causing the output to provide the data collector with a secured transmission comprising the third data 650. forming third data using a self-contained protocol for securely transmitting information between parties 655. receiving a data request from the data collector for the third data, the request optionally comprising a nonce 660. causing the root of trust circuitry to form the signature from at least the hash, the time stamp, and the nonce 665. forming a second signature from at least the second data and the hash

Fig. 7A 700. obtaining continually data items from the apparatus by the input 705. storing the information 710. causing storing the received first data items as a first group by the memory 715. obtaining a secured data transmission from the apparatus, the secured data transmission comprising third data 720. obtaining from the third data at least second data; a hash; and a first signature 725. verifying validity of the hash in comparison to the at least the second data 730. verifying validity of the first signature at least in comparison to the hash 735. obtaining a second group of data items from the second data 740. verifying correctness of the first group of data items in comparison to the second group of data items 745. determining the first group of data items as valid if each of the verifications were successful 750. obtaining a second signature from the secured transmission 755. verifying validity of the second signature using at least the third data

METHOD AND APPARATUS FOR SECURING REAL-TIME DATA TRANSFER FROM A DEVICE

TECHNICAL FIELD

Various example embodiments relate to securing real-time data transfer from a device.

BACKGROUND

This section illustrates useful background information without admission of any technique described herein representative of the state of the art.

Various devices produce and transfer real-time data for use by other devices. For example, medical devices may obtain time-dependent measurements such as heart-rate measurements. Such data may be transferred to a data collector for subsequent use over a real-time channel, e.g., for displaying or monitoring needs.

The real-time channel may be entirely formed of a short-range radio connection. The real-time channel may be inherently somewhat protected from tampering. On the other hand, the real-time channel may comprise a portion exposed to tampering. For example, the real-time channel may employ the Internet. The origin of the data may be conveniently obscured by use of pseudonyms, for example. However, the data may yet be tampered on transit. This might be inconvenient or even dangerous, depending on the subsequent use of the data, as the tampering might not even be detectable.

While the data may be tampered, so can in some cases also the device be tweaked, or data of one device could be used to replace those of another device.

In cryptographic tamper-proofing data, a typical solution is to employ processing with too high computation cost to cheat with brute force. Longer keys and more demanding algorithms are used to mitigate attacks of different sorts. However, in some applications, the devices should have low cost, long battery life and/or light weight, in conflict with heavy cryptographic processing. Moreover, some cryptographic measures are intentionally slow. Hence, in many cases, it is not feasible to simply input data and encrypt the data for transfer in a secure manner such that the data could not be manipulated at any stage since receiving from sensor equipment.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first example aspect of the present invention, there is provided an apparatus comprising:
a data source for receiving a plurality of data items;
an output configured to continually provide a data collector with the data items;
a storage for buffering the first data items;
a root of trust circuitry configured to generate a cryptographically verifiable integrity claim based on current hardware and software configuration of the apparatus;
at least one processor configured to at least:
form second data by combining at least the cryptographically verifiable integrity claim and an amount of the data items;
form a hash from at least the second data;
cause the root of trust circuitry to form a first signature from at least the hash;
form third data by combining at least the second data, the hash and the first signature; and
cause the output to provide the data collector with a secured transmission comprising the third data.

In the context of verifiably integrity claim, integrity may refer to a state of the apparatus as determined by the root of trust circuitry.

The at least one processor may be further configured to obtain a stamp, such as a time stamp. The at least one processor may be configured to cause the root of trust circuitry to form the first signature from a combination of at least the hash and the stamp.

The at least one processor may be configured to form third data using a self-contained protocol for securely transmitting information between parties. The protocol may be JavaScript Web Token, JWT. The protocol may comprise a signature section comprising a signed hash of a header and payload of a transmission. The at least one processor may be further configured to sign at least the third data and form a second signature.

The root of trust circuitry may comprise a trusted platform module. The root of trust circuitry may comply with trusted platform module 2.0 specification of Trusted Computing Group. The first signature may be formed using an identification (e g, name) an attestation key of the root trust circuitry as one part of the combination from which the first signature is formed.

The apparatus may further comprise an input for receiving a data request from the data collector for the third data. The request may comprise a nonce. The nonce may be received by the input before the request. The nonce may be received among a plurality of different nonces.

The nonce may be a replay attack protection code. The replay attack protection code may comprise a random code. The replay attack protection code may comprise a sequentially varying code. The at least one processor may be configured to cause the root of trust circuitry to form the first signature from at least the hash, the time stamp, and the nonce.

The at least one processor may be configured to form a second signature from at least the second data and the hash.

The stamp may be a time stamp. Alternatively, the stamp may be a sequence order indicator.

In this document, combining may refer to merger of two data sets so that two data sets remain separable. The combining may be additive. Alternatively, combining may refer to a fusing merger in which one data set is used to direct conversion of another data set. For example, one data set may be used as a cryptographic key or portion thereof for converting the other data set. Further alternatively, the combining may refer to partially additive and partially fusing merger.

The data collector may by physically separate from the apparatus. The apparatus may comprise a data collector configured to collect data from another apparatus.

The apparatus may be configured to inform the data collector with both a real-time channel and secured communication channel. The real-time channel may be a wireless channel. Alternatively, the real-time channel may be a wired channel. The real-time channel may comprise an ethernet link. The real-time channel may comprise a wireless LAN link. The real-time channel may comprise a universal serial bus link. The secured communication channel may be asynchronous. Alternatively, the secured communication channel may be iso-synchronous. Alternatively, the secured communication channel may be synchronous.

The continually providing of the data collector with the data items may provide the data collector with a real-time communication channel. The real-time communication channel may be not secured by the apparatus using the root of trust circuitry.

The continually providing of the data collector with the data items may provide the data collector using a batch communication channel. The batch communication channel may be not secured by the apparatus using the root of trust circuitry.

The data collector may be provided with the third data using a real-time communication channel. Alternatively, or additionally, the data collector may be provided with the third data using a batch communication channel.

The apparatus may be a medical apparatus. The data source may be a sensor input. The sensor input may be configured to obtain medical sensor data.

The at least one processor may be configured to cause performing operations in a secure environment. The secure environment may comprise a CPU enclave. The secure environment may comprise software guard extensions. The secure environment may comprise TrustZone. The secure environment may comprise AMD's® SKINIT, SME, and/or SEV. The secure environment may be bounded by a TPM session. The secure environment may comprise a trusted execution environment.

According to a second example aspect of the present invention, there is provided a device for operating as a data collector, the device comprising:
an input for receiving information from an apparatus;
a memory for storing information;
at least one processor configured to at least:
obtain continually data items from the apparatus by the input;
cause storing the received first data items as a first group by the memory;
obtain a secured data transmission from the apparatus by the input, the secured data transmission comprising third data;
obtain from the third data at least second data; a hash; and a first signature;
verify validity of the hash in comparison to the at least the second data;
verify validity of the first signature at least in comparison to the hash;
obtain at least a cryptographically verifiable integrity claim and a second group of data items from the second data;
verify correctness of the first group of data items in comparison to the second group of data items; and
determine the first group of data items as valid if each of the verifications were successful.

The at least one processor may further be configured to:
obtain a second signature from the secured transmission;
verify validity of the second signature using at least the third data;
and perform the determining the first group of data items as valid only if the second signature is verified as valid.

The verifying of the correctness of the first group of data items in comparison to the second group of data items may be configured to allow given tolerance. The tolerance may be predetermined. The tolerance may be based on a quality of a communication channel between the apparatus and the device. The verifying of the correctness of the first group of data items in comparison to the second group of data items may comprise interpolating data items of the first group. The interpolating may comprise rejecting or averaging data items deviating beyond a given threshold from interpolated values.

The at least one processor may further be configured to obtain a cryptographically verifiable integrity claim from the secured transmission. The at least one processor may further be configured to cause verifying the cryptographically verifiable integrity claim from the secured transmission.

The at least one processor may further be configured to perform the verifying of the first signature using an attestation server.

According to a third example aspect of the present invention, there is provided a method in an apparatus, comprising:
receiving from a data source a plurality of data items;
continually providing a data collector with the data items;
buffering the first data items;
generating by a root of trust circuitry a cryptographically verifiable integrity claim based on current hardware and software configuration of the apparatus;
forming second data by combining at least the cryptographically verifiable integrity claim and an amount of the data items;
forming a hash from at least the second data;
causing the root of trust circuitry to form a first signature from at least the hash;
forming third data by combining at least the second data, the hash and the first signature; and
providing the data collector with a secured transmission comprising the third data.

The method may further comprise obtaining a stamp.

The first signature may be formed from a combination of at least the hash and a stamp.

According to a fourth example aspect of the present invention, there is provided a method in a data collector, comprising:
receiving information from an apparatus;
storing information;
obtaining continually data items from the apparatus;
storing the received first data items as a first group;
obtaining a secured data transmission from the apparatus, the secured data transmission comprising third data;
obtaining from the third data at least second data; a hash; and a first signature;
verifying validity of the hash in comparison to the at least the second data;
verify validity of the first signature at least in comparison to the hash;
obtaining a second group of data items from the second data;
verifying correctness of the first group of data items in comparison to the second group of data items; and
determining the first group of data items as valid if each of the verifications were successful.

The method may further comprise a cryptographically verifiable integrity claim from the second data. The method may further comprise verifying integrity of the apparatus using the cryptographically verifiable integrity claim.

According to a fifth example aspect of the present invention, there is provided a computer program comprising computer executable program code configured to execute any method of any example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a sixth example aspect of the present invention, there is provided an apparatus comprising a memory and a processor that are configured to cause the apparatus to perform the method of any example aspect.

According to a seventh example aspect of the present invention, there is provided an apparatus comprising means for performing the method of any example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 6 shows a flow chart of a process of an example embodiment; and

DETAILED DESCRIPTION OF THE DRAWINGS

An example embodiment of the present invention and its potential advantages are understood by referring to FIGS. 1 through 7B of the drawings. In this document, like reference signs denote like parts or steps.

Figure 1:
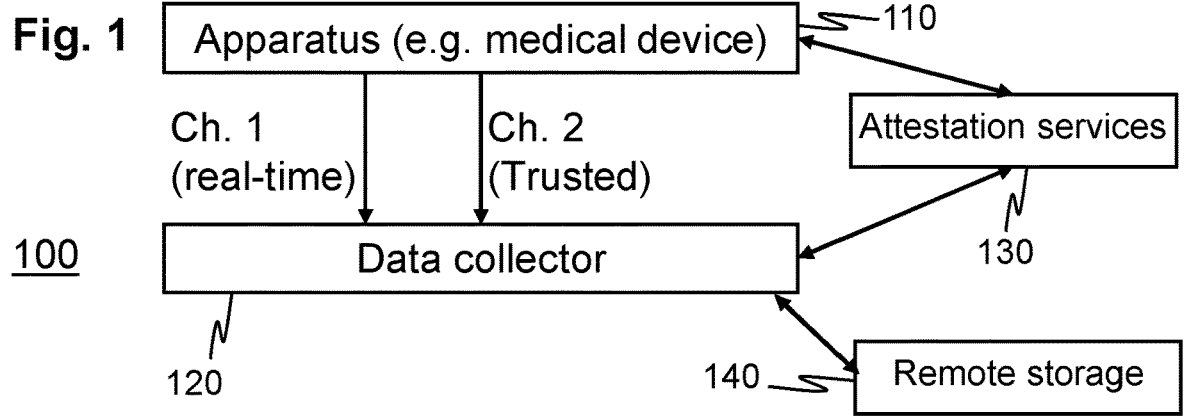
FIG. 1 shows an architectural drawing of a system of an example embodiment.

FIG. 1 shows an architectural drawing of a system 100 of an example embodiment. FIG. 1 shows an apparatus 110, a data collector 120, an attestation server 130, and a remote storage 140. The apparatus is in an embodiment a medical device. In an example embodiment, the medical device is configured to receive continually sensor data or other data from a data source. In an example embodiment, the data source is a sensor input. In an example embodiment, the sensor input is configured to obtain medical sensor data.

FIG. 1 shows transfer of data from the apparatus 110 to the data collector 120 over a first communication channel Ch. 1 to provide the data collector with data items, such as the sensor data.

The first communication channel Ch. 1 may be a real-time channel for transferring data to the data collector 120, in this case without any particular securing (although there may be some inherent security, if the communication channel uses a link that is inherently secured, such as a wireless LAN or cellular link that is encrypted).

The second communication channel Ch. 2 of FIG. 1 is a trusted channel. In some implementations, the first and second communication channels Ch. 1, Ch. 2 use same bearer or transport or link layer communication channel(s), but the second communication channel Ch. 2 can be understood as secured because the data transmitted here is cryptographically protected as will be explained in the following.

In an example embodiment, the secured communication channel Ch. 2 is be asynchronous. In an example embodiment, the secured communication channel Ch. 2 is iso-synchronous. In an example embodiment, the second communication channel Ch. 2 is synchronous.

In an example embodiment, the data collector is physically separate from the apparatus. In an example embodiment, the apparatus comprises a data collector configured to collect data from another apparatus.

The apparatus 110 and the data collector 120 are drawn to be connected to attestation services 130. Here, as well as in other blocks, the actual entity may be implemented with one or more co-located, distributed, virtualised, or otherwise implemented parts.

The data collector 120 is further in communicative connection with the remote storage 140. In some implementations, a local storage is used by the data collector instead of a remote one.

Figure 2:
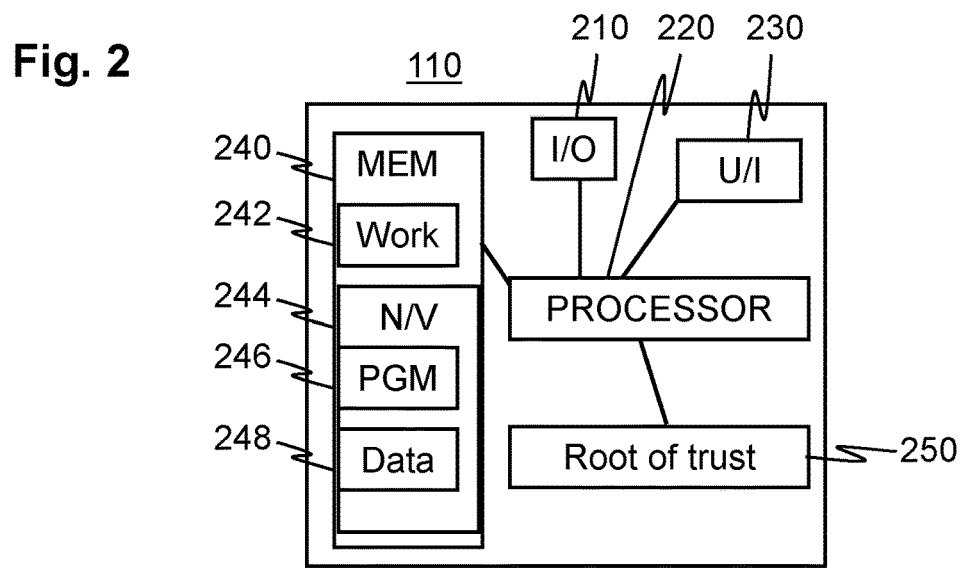
FIG. 2 shows a block diagram of an apparatus of an example embodiment.

FIG. 2 shows a block diagram of the apparatus 110. The apparatus 110 comprises a memory 240 including a work memory 242 and a persistent memory 244. The persistent memory comprises computer program code 246 and data 248 to be stored beyond shutdown events. The apparatus 110 further comprises a processor 220 for controlling the operation of the apparatus 110 using the computer program code 246, and a communication unit 210 for communicating with other nodes. The communication unit 210 comprises, for example, a local area network (LAN) port; a wireless local area network (WLAN) unit; Bluetooth unit; cellular data communication unit; or satellite data communication unit. The processor 220 comprises, for example, any one or more of: a master control unit (MCU); a microprocessor; a digital signal processor (DSP); an application specific integrated circuit (ASIC); a field programmable gate array; and a microcontroller.

The apparatus 110 further comprises a root of trust circuitry 250. The root of trust circuitry may comprise a trusted platform module, TPM. In an example embodiment, the root of trust circuitry complies with trusted platform module 2.0 specification of Trusted Computing Group. In an example embodiment, the first signature is formed using an identification of an attestation key of the root trust circuitry as one part of the combination from which the first signature is formed.

In an example embodiment, the processor is configured to cause performing operations in a secure environment, which may comprise a CPU enclave. In an example embodiment, the secure environment may comprise software guard extensions, TrustZone, AMD's® SKINIT, SME, and/or SEV. In an example embodiment, the secure environment is bounded by a TPM session. In an example embodiment, the secure environment comprises a trusted execution environment.

Figure 3:
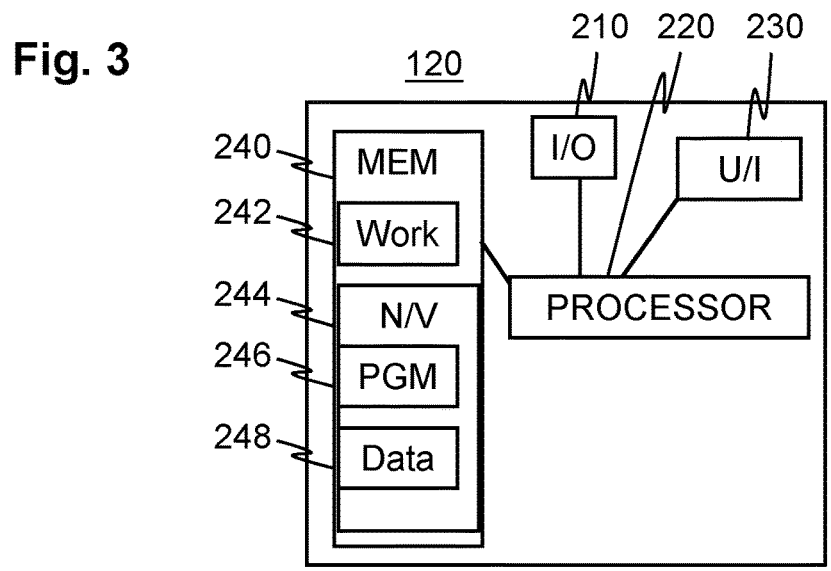
FIG. 3 shows a block diagram of a collector device of an example embodiment.

FIG. 3 shows a block diagram of a collector device 120 according to an embodiment of the invention. The block diagram differs from that of FIG. 2 only by lacking the root of trust circuitry 250.

In both FIGS. 2 and 3, there is drawn a user interface 230 that is an optional part. Moreover, various other functionalities described herein are not necessary to include in all implementations. For example, it is not necessary that the apparatus 110 be capable of storing any information into the persistent memory 244.

Figure 4:
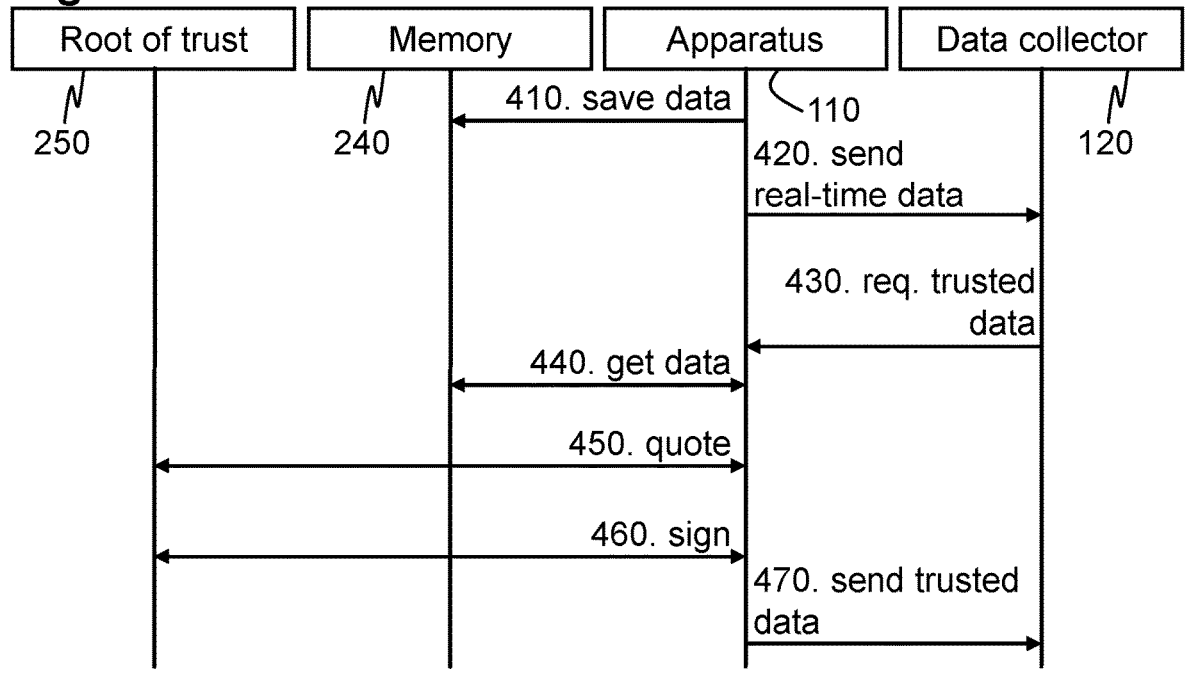
FIG. 4 shows a signaling chart of a method of an example embodiment in an apparatus.

Operation of the apparatus 110 is next exemplified with reference to FIGS. 4 and 6. The apparatus 110 receives 600 from the data source a plurality of data items, e.g., from one or more medical sensors. The operation of the apparatus may further comprise any of:

- continually providing 605, 420 by an output a data collector with the data items;
- buffering 610, 410 by the memory the first data items;
- generating 615, 450 by a root of trust circuitry a cryptographically verifiable integrity claim or quote based on current hardware and software configuration of the apparatus;
- performing by the processor at least:
- getting 440 the first data items from the memory;
- forming 620 second data by combining at least the cryptographically verifiable integrity claim and an amount of the data items;
- forming 625 a hash from at least the second data;
- optionally obtaining 630 a stamp;
- causing 635, 460 the root of trust circuitry to form a first signature from at least the hash and optionally the stamp;
- forming 640 third data by combining at least the second data, the hash and the first signature; and
- causing 645 the output to provide 470 the data collector with a secured transmission comprising the third data.

Hashing may here refer to forming a unidirectional cryptographic derivative intended to characterize source information while making it difficult or impossible to backwards detect the source information itself. A hash may contain less information than the source data.

In an example embodiment, the processor 220 further performs forming 650 third data using a self-contained protocol for securely transmitting information between parties. The protocol may be JavaScript Web Token, JWT. The protocol may comprise a signature section comprising a signed hash of a header and payload of a transmission. The processor 220 may be further configured to sign at least the third data and form a second signature.

In an example embodiment, the processor 220 further performs receiving 655, 430 a data request from the data collector for the third data, the request optionally comprising a nonce. The nonce may be received by the input before the request. The nonce may be received among a plurality of different nonces. The nonce may be a replay attack protection code. The replay attack protection code may comprise a random code. In an example embodiment, the replay attack protection code comprises a sequentially varying code.

The at least one processor may be configured to perform causing 660 the root of trust circuitry to form the first signature from at least the hash, the time stamp, and the nonce.

The at least one processor may be configured to perform forming 665 a second signature from at least the second data and the hash.

The stamp may be a time stamp. Alternatively, the stamp may be a sequence order indicator, such as a sequence counter.

In this document, combining may refer to merger of two data sets so that two data sets remain separable. The combining may be additive. For example, the combining may comprise concatenating data sets. Alternatively, combining may refer to a fusing merger in which one data set is used to direct conversion of another data set. For example, one data set may be used as a cryptographic key or portion thereof for converting the other data set, or some function such as exclusive or (XOR) may be used to join two data sets. Further alternatively, the combining may refer to partially additive and partially fusing merger.

Figure 5:
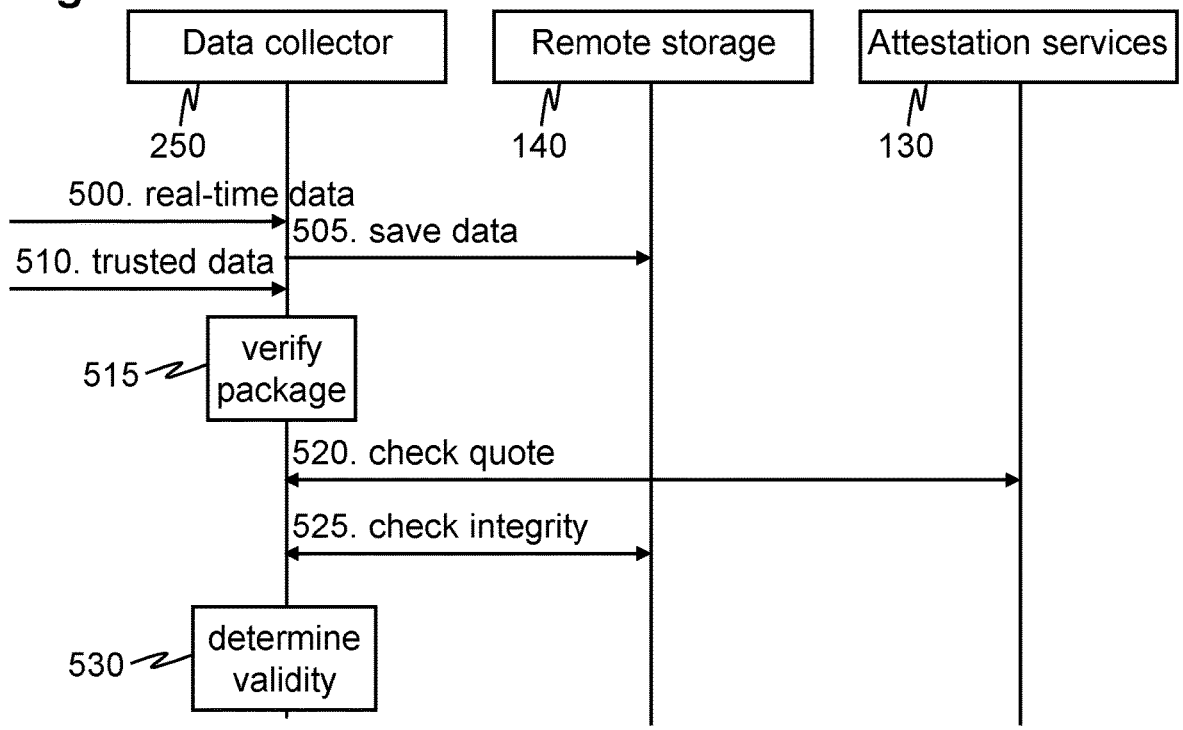
FIG. 5 shows a signaling chart of a method of an example embodiment in a collector device.
Figure 7B:
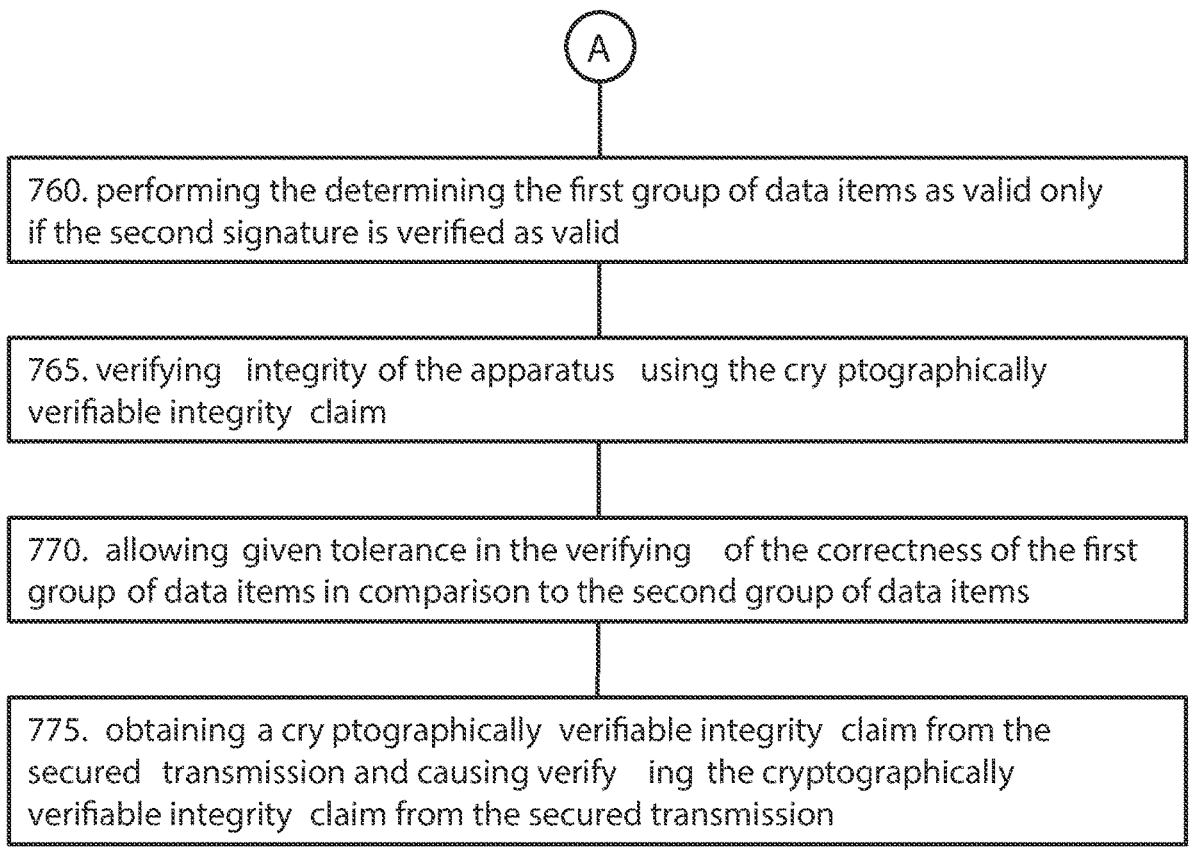
FIGS. 7A and B show a flow chart of a process of an example embodiment.

Operation of the data collector 120 is next exemplified with reference to FIGS. 5, 7A and 7B.

The data collector 120 performs:
- performing with the processor 220 at least:
- obtaining 700, 420 continually data items from the apparatus by the input;
- storing 705 the information;
- causing 710 storing 530 the received first data items as a first group by the memory;
- obtaining 715, 510 a secured data transmission from the apparatus by the input, the secured data transmission comprising third data;
- obtaining 720 from the third data at least second data; a hash; and a first signature;
- verifying 725, 715 validity of the hash in comparison to the at least the second data;
- verifying 730, 520 validity of the first signature at least in comparison to the hash;
- obtaining 735 at least a cryptographically verifiable integrity claim and a second group of data items from the second data;
- verifying 740, 525 correctness of the first group of data items in comparison to the second group of data items; and
- determining 745, 530 the first group of data items as valid if each of the verifications were successful.

The operation may further comprise any of:
- obtaining 750 a second signature from the secured transmission, which second signature may be formed, e.g., with JWT;
- verifying 755 validity of the second signature using at least the third data;
- performing 760 the determining the first group of data items as valid only if the second signature is verified as valid.

The method may further comprise verifying 765 integrity of the apparatus using the cryptographically verifiable integrity claim.

In an example embodiment, the operation further comprises allowing 770 given tolerance in the verifying of the correctness of the first group of data items in comparison to the second group of data items. The tolerance may be predetermined. The tolerance may be based on a quality of a communication channel between the apparatus and the device. The verifying of the correctness of the first group of data items in comparison to the second group of data items may comprise interpolating data items of the first group. The interpolating may comprise rejecting or averaging data items deviating beyond a given threshold from interpolated values.

In an example embodiment, the operation further comprises obtaining 775 a cryptographically verifiable integrity claim from the secured transmission and causing verifying the cryptographically verifiable integrity claim from the secured transmission. The verifying of the first signature may employ the attestation server.

As used in this application, the term "circuitry" may refer to one or more or all of the following:
(a) hardware-only circuit implementations (such as implementations in only analog and/or digital circuitry) and;
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that Inter-machine data transfer can be provided with little delay and also with good certainty of data correctness using two parallel logical communication channels, one of which may be real-time and the other one is comprehensively protected to detect any tampering. Another technical effect of one or more of the example embodiments disclosed herein is that various replay attacks can be mitigated. Yet another technical effect of one or more of the example embodiments disclosed herein is that tampering of the apparatus reporting sensor data or other information can be identified from securely produced cryptographic data that accounts for the configuration of the apparatus.

Embodiments of the present invention may be implemented in software, hardware, application logic or a combination of software, hardware, and application logic. The software, application logic and/or hardware may reside on an apparatus, attestation service or Data collector. In an example embodiment, the application logic, software, or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
a processor and memory including computer program code, wherein the memory and computer program code are configured to, with the processor, cause the apparatus to:
receive a plurality of first data items from a data source;
provide the first data items to a collector;
buffer the first data items;
generate a cryptographically verifiable integrity claim based on current hardware and software configuration of the apparatus;
form second data by combining at least the cryptographically verifiable integrity claim and an amount of the first data items;
form a hash from at least the second data;
cause the root of trust circuitry to form a first signature from at least the hash;
form third data by combining at least the second data, the hash and the first signature; and
provide the data collector with a secured transmission comprising the third data.

2. The apparatus of claim 1, wherein the memory and computer program code are further configured to, with the processor, cause the apparatus to form the third data using a self-contained protocol for securely transmitting information between parties.

3. The apparatus of claim 1, wherein the memory and computer program code are further configured to, with the processor, cause the apparatus to sign at least the third data and form a second signature.

4. The apparatus of claim 1, wherein the apparatus comprises a
root of trust circuitry comprising a trusted platform module; and
the first signature is formed using an identification of an attestation key of the root trust circuitry as one part of the combination from which the first signature is formed.

5. The apparatus of claim 4, wherein the memory and computer program code are further configured to, with the processor, cause the root of trust circuitry to form the first signature from at least the hash, the time stamp, and a nonce provided by the data collector.

6. The apparatus of claim 1, wherein the memory and computer program code are further configured to, with the processor, cause the apparatus to form a second signature from at least the second data and the hash.

7. The apparatus of claim 1, wherein the data source is a sensor input.

8. The apparatus of claim 1, wherein the memory and computer program code are further configured to, with the processor, cause the apparatus to receive a data request from the data collector for the third data.

9. An apparatus operating as a data collector, the apparatus comprising a processor and memory including computer program code, wherein the memory and computer program code are configured to, with the processor, cause the apparatus to:
    obtain first data items from another apparatus;
        store the received first data items as a first group;
        obtain a secured data transmission from the another apparatus, the secured data transmission comprising third data;
        obtain from the third data at least second data; a hash; and a first signature;
        verify validity of the hash in comparison to the at least the second data;
        verify validity of the first signature at least in comparison to the hash;
        obtain a second group of data items from the second data;
        verify correctness of the first group of data items in comparison to the second group of data items; and
        determine the first group of data items as valid if each of the verifications were successful.

10. The apparatus of claim 9, wherein the memory and computer program code are further configured to, with the processor, cause the apparatus to:
    obtain a second signature from the secured transmission;
    verify validity of the second signature using at least the third data;
    and perform the determining the first group of data items as valid only if the second signature is verified as valid.

11. The apparatus of claim 9, wherein the memory and computer program code are further configured to, with the processor, cause the apparatus to perform: allowing given tolerance in the verifying of the correctness of the first group of data items in comparison to the second group of data items.

12. The apparatus of claim 11, wherein the tolerance is based on a quality of a communication channel between the apparatus and the device.

13. The apparatus claim 9, wherein the memory and computer program code are further configured to, with the processor, cause the apparatus to:
    obtain a cryptographically verifiable integrity claim from the secured transmission; and
    cause verifying the cryptographically verifiable integrity claim from the secured transmission.

14. A method in an apparatus, comprising:
    receiving from a data source a plurality of data items;
    continually providing a data collector with the data items;
    buffering the first data items;
    generating by a root of trust circuitry a cryptographically verifiable integrity claim based on current hardware and software configuration of the apparatus;
    forming second data by combining at least the cryptographically verifiable integrity claim and an amount of the data items;
    forming a hash from at least the second data;
    obtaining a stamp;
    causing the root of trust circuitry to form a first signature from at least the hash;
    forming third data by combining at least the second data, the hash and the first signature; and
    providing the data collector with a secured transmission comprising the third data.

15. A method in a data collector, comprising:
    receiving information from an apparatus;
    storing information;
    obtaining continually data items from the apparatus;
    storing the received first data items as a first group;
    obtaining a secured data transmission from the apparatus, the secured data transmission comprising third data;
    obtaining from the third data at least second data; a hash; and a first signature;
    verifying validity of the hash in comparison to the at least the second data;
    verify validity of the first signature at least in comparison to the hash;
    obtaining a second group of data items from the second data;
    verifying correctness of the first group of data items in comparison to the second group of data items; and
    determining the first group of data items as valid if each of the verifications were successful.

* * * * *